(12) United States Patent
Hill et al.

(10) Patent No.: US 6,264,146 B1
(45) Date of Patent: Jul. 24, 2001

(54) PORTABLE CONTROLLER FOR AN AIRCRAFT

(75) Inventors: Terrence L. Hill, Swedesboro, NJ (US); Gerard F. Capron, Phoenixville, PA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/455,668

(22) Filed: Dec. 7, 1999

(51) Int. Cl.$^7$ .......................... B64C 13/04; B64C 13/12; G05D 1/00
(52) U.S. Cl. .......................... 244/234; 244/229; 244/1 R; 244/197
(58) Field of Search ................... 244/234, 229, 244/190, 189, 196, 197, 1 R, 3.11; 434/14, 11, 43, 29

(56) References Cited

U.S. PATENT DOCUMENTS

| | | | |
|---|---|---|---|
| 3,979,057 | * 9/1976 | Katz et al. | 235/156 |
| 4,236,212 | 11/1980 | Arents | 364/424 |
| 4,432,731 | * 2/1984 | Batchie | 434/11 |
| 4,845,495 | 7/1989 | Bollard et al. | 340/973 |
| 4,862,374 | * 8/1989 | Ziemann | 364/449 |
| 4,947,334 | 8/1990 | Massey et al. | 364/433 |
| 4,977,509 | * 12/1990 | Pitchford et al. | 364/449 |
| 5,059,970 | * 10/1991 | Raubenheimer et al. | 342/451 |
| 5,715,163 | 2/1998 | Bang et al. | 364/444.2 |
| 5,758,297 | 5/1998 | Gaultier | 701/14 |
| 5,805,807 | * 9/1998 | Hanson et al. | 395/403 |
| 5,889,493 | * 3/1999 | Endo | 342/357 |
| 6,064,922 | * 5/2000 | Lee | 701/3 |

* cited by examiner

Primary Examiner—Charles T. Jordan
Assistant Examiner—Christian M. Best
(74) Attorney, Agent, or Firm—Harness Dickey & Pierce P.L.C.

(57) ABSTRACT

A portable, hand-holdable controller for interfacing with various flight control, weapons control and other subsystems of an aircraft by a crew member who is not piloting the aircraft. In a preferred embodiment the portable controller includes a keyboard, a mode selector switch and a cursor control. The mode selector switch allows the controller to be interfaced with a plurality of independent multi-function display (MFD) or multi-purpose display (MPD) systems. The cursor control enables the non-pilot crew member to control the cursor on the display being interfaced with. The keyboard allows the non-pilot crew member to enter alphanumeric data or commands to the display being interfaced to. Interfacing is accomplished by coupling the controller via a suitable cable to a convenient point on a control panel of the aircraft. The controller is lightweight and compact and able to be held with one or both hands by the non-pilot crew member or alternatively strapped to a thigh of the crew member. The controller significantly improves the ergonomics associated with controlling the various systems of the aircraft which would otherwise require a significant number of repetitive hand movements by the non-pilot reaching to the control panel of the aircraft. The controller also eliminates the need for replicating various switches on the control panel. In an alternative embodiment a pair of independent cursor controls are used for independently controlling cursors on separate display systems of the aircraft. A visual display panel is also included for viewing data input from a keyboard of the controller.

15 Claims, 5 Drawing Sheets

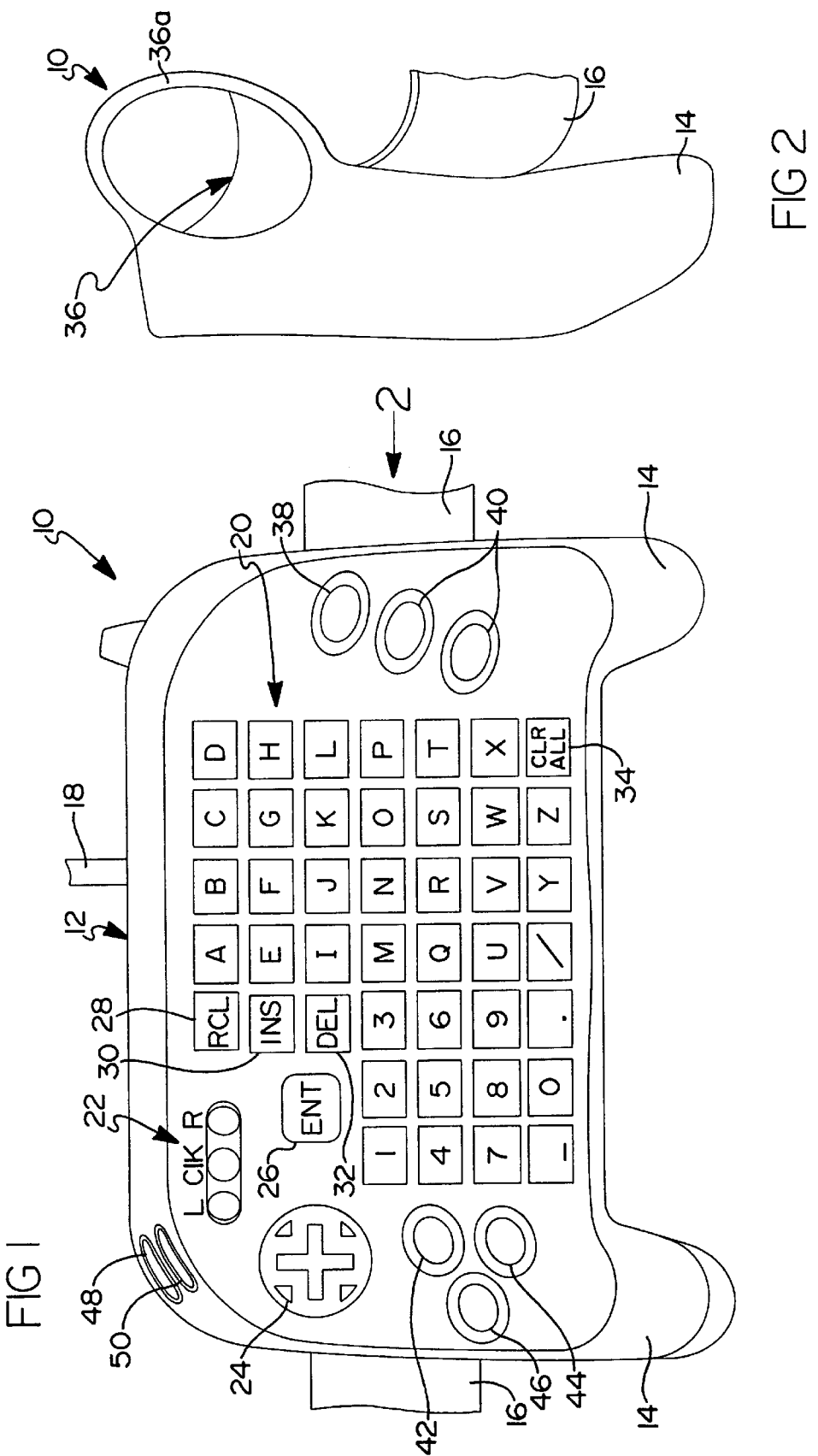

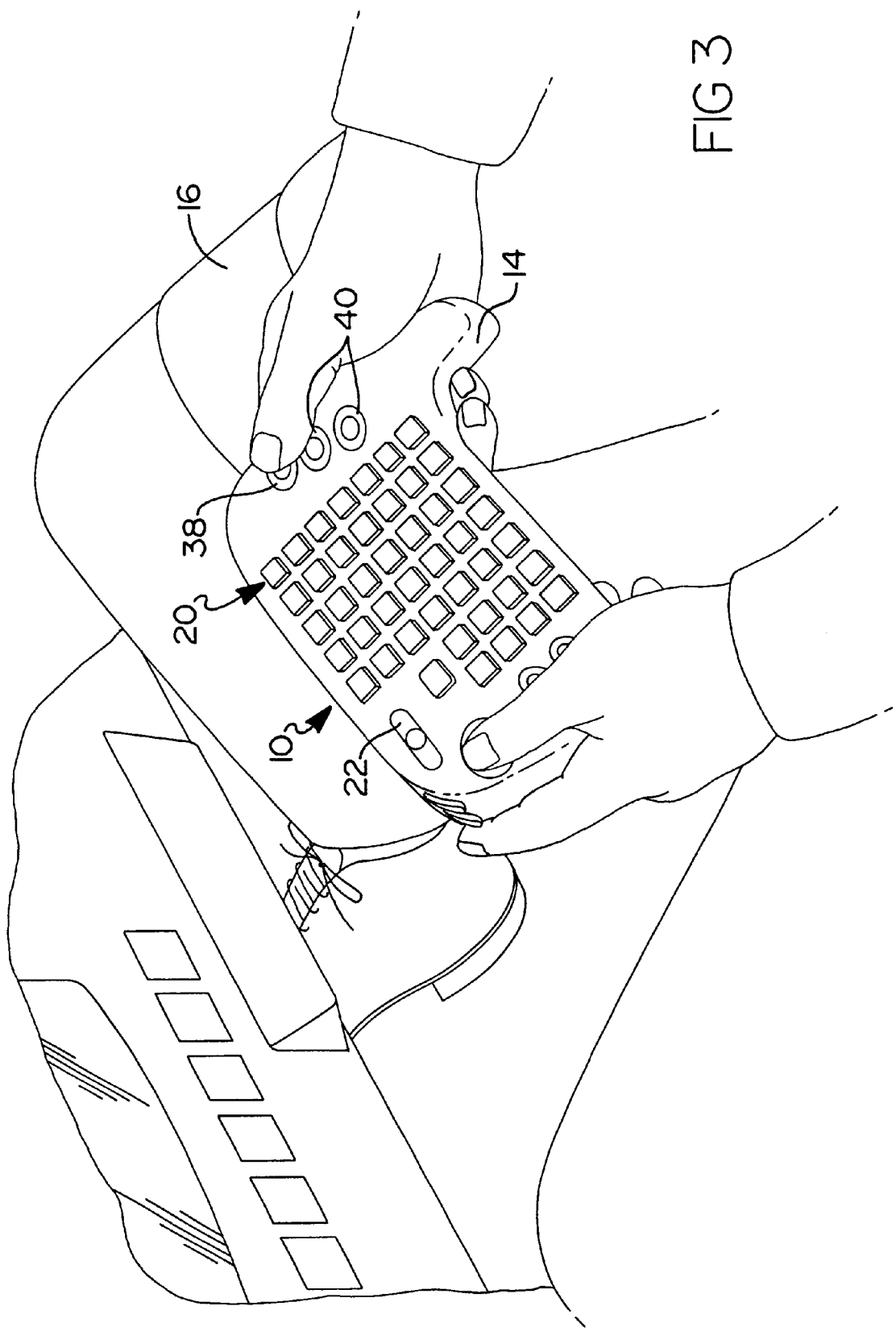

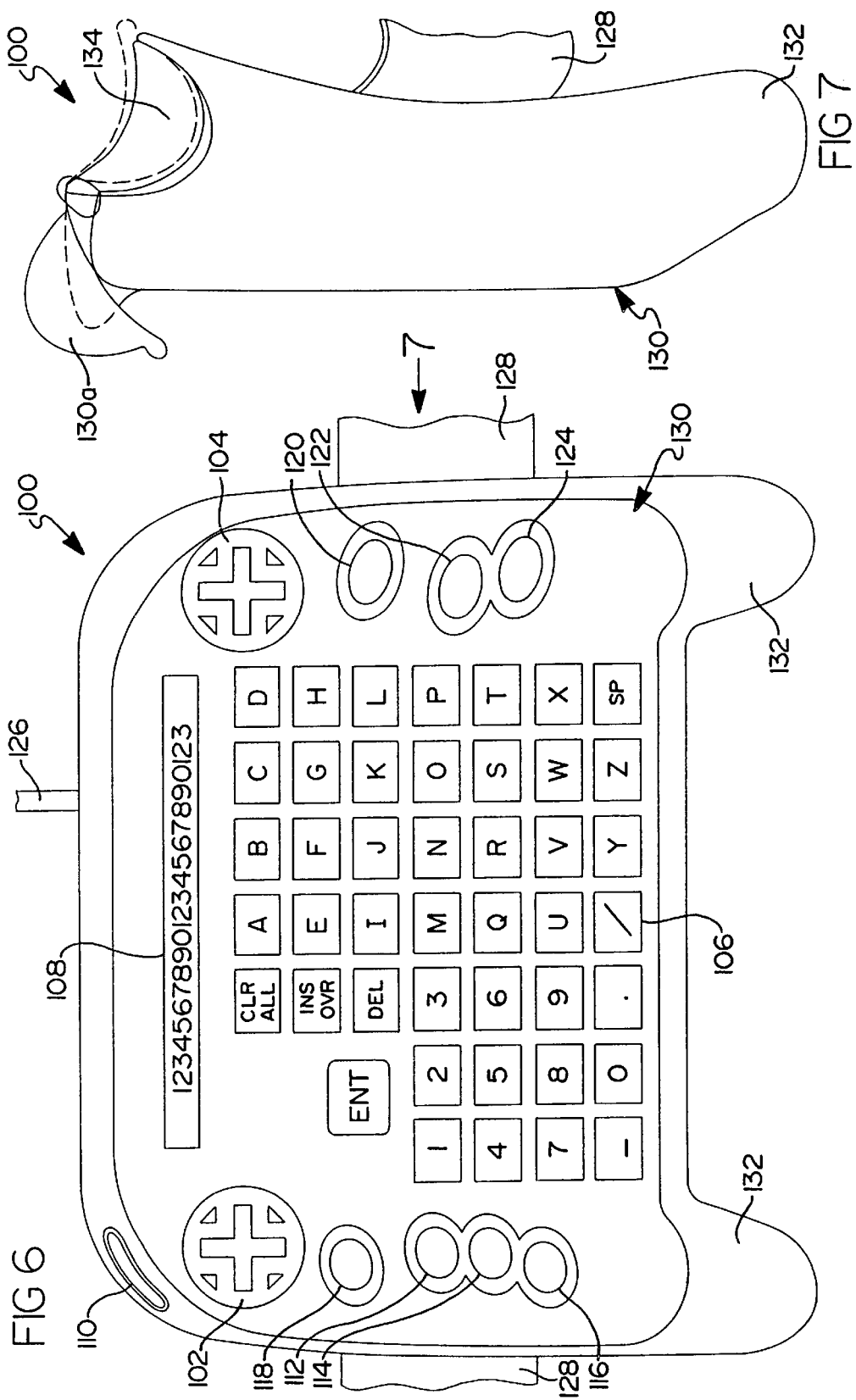

PORTABLE CONTROLLER FOR AN AIRCRAFT

This invention was made pursuant to U.S. Government contract number DAAJ09-91-C-A004. The U.S. Government has certain rights in this invention.

TECHNICAL FIELD

This invention relates to flight and/or weapons control systems for aircraft, and more particularly to a portable controller adapted to be held by a non-pilot crew member for enabling the non-pilot crew member to remotely communicate with the flight and/or weapons control systems of the aircraft.

BACKGROUND OF THE INVENTION

With many present day aircraft, and particularly military aircraft such as military rotorcraft, various important flight control weapons and sensor switches are located on the "collective" or the "side arm" controller (commonly known as "grips") in the cockpit of the aircraft. With military fly-by-wire aircraft, such aircraft are extremely responsive to small inputs on the collective and side arm controller. The crew member who is not flying the aircraft (i.e., the "non-pilot" crew member) cannot therefore make any control inputs. More specifically, the non-pilot crew member cannot have his/her hands on the collective or side arm controller.

To address the above-described problem, some aircraft dedicate large amounts of panel space to replicate the grip switches. However, in many aircraft, such as military rotorcraft which make use of small cockpits having a large amount of glass, the amount of available control panel surface for mounting additional flight control, weapons control and sensor switches is highly restricted.

Another drawback with cockpits of military aircraft is that they are often extremely small and do not always allow for positioning or laying out of the various displays used in the aircraft for maximum ergonomic convenience. Often, the required locations of various controls that are needed for the pilot and/or crew member to enter text data to support digital communications are not located physically close to where the entered data ultimately appears on a related display system in the cockpit. This can also contribute to increased crew stress and significantly increased eye and hand motions for performing the needed flight and weapons control inputs and the inputs for controlling the various sensors of the aircraft.

Accordingly, it would be highly desirable to provide some form of portable or hand-holdable controller which would permit the non-pilot crew member of an aircraft to enter flight control data and/or commands, weapons systems commands and/or other various commands relating to control of the sensors of the aircraft without having to access the related controls on the grips of the aircraft, and further without requiring additional controls, displays or other items to be mounted on the control panel of the aircraft.

It would also be highly desirable to provide a portable controller capable of being easily held by the non-pilot crew member or easily rested on a leg of the non-pilot crew member, and which further may be configured to communicate with selected flight and/or weapons control systems remotely so as not to interfere with operation of the same controls by the crew member piloting the aircraft, and further without requiring the controller to be disconnected and reconnected at various interface points on the control panel of the aircraft.

It is yet another object of the present invention to provide a portable controller which is very compact, low in weight, includes a keyboard and other various controls, and allows the non-pilot crew member access to and control over the various flight and/or weapons control systems of the aircraft without interfering with use of those control systems by the crew member piloting the aircraft.

SUMMARY OF THE INVENTION

The above objects are provided by a portable controller in accordance with the preferred embodiments of the present invention. The preferred embodiments form a portable, hand-holdable controller which the crew member who is not piloting an aircraft can either hold in one or both hands or attach to one leg. The controller is interfaced with the control panel of the aircraft via a suitable interface cable which allows the controller to communicate with the various flight, weapons control and/or sensors of the aircraft without the non-flying crew member having to access these controls on the collective or side arm controller of the aircraft, and thus eliminating the possibility of unintended flight control inputs being accidentally made.

The portable controller of the present invention includes a housing which is easily held by one or both hands of the non-pilot crew member and further shaped so as to permit convenient resting on a thigh of the non-pilot crew member when he/she is in the seated position. The housing includes a keyboard, a cursor (i.e., "slew") control, and preferably a mode select switch. The cursor control allows the non-pilot crew member to move the cursor on various displays, such as a multipurpose display (MPD) or a multi-function display (MFD) of the aircraft in remote fashion. The keyboard allows the non-pilot crew member to enter flight commands and/or flight data to various flight control systems, also in remote fashion.

The mode select switch, if incorporated, allows the portable controller to be switched between various independent flight control systems of the aircraft. In this manner, the portable controller of the present invention can communicate with several independent flight control systems without the need for disconnecting and reconnecting its interface cable to the various systems on the control panel of the aircraft.

In a preferred embodiment the portable controller also includes a trigger for allowing the non-pilot crew member to launch various weapons if the aircraft is a military aircraft. For military applications, additional switches can be provided for controlling the weapons bay of the aircraft and various other weapons related functions.

In an alternative preferred embodiment of the present invention the mode select switch is not used, and separate cursor control switches are used to independently interface with different display systems of the aircraft. This embodiment also incorporates a small display panel for viewing data or commands input from the controller.

The portable controller of the present invention in its various embodiments thus enables remote control over a wide variety of flight/weapons/sensor control systems of the aircraft by the non-pilot crew member. The portable controller also allows for much more convenient input of various flight/weapons/sensor control inputs by enabling these inputs to be made more quickly and with fewer repetitive hand motions than would otherwise be required if the non-pilot crew member was required to input the commands at the control panel of the aircraft.

BRIEF DESCRIPTION OF THE DRAWINGS

The various advantages of the present invention will become apparent to one skilled in the art by reading the following specification and subjoined claims and by referencing the following drawings in which:

FIG. 1 is a front view of a portable controller in accordance with a preferred embodiment of the present invention;

FIG. 2 is a side view of the controller of FIG. 1 in accordance with directional arrow 2 in FIG. 1;

FIG. 3 is a perspective view of the portable controller of FIG. 1 being held by both hands of a non-pilot crew member;

FIG. 6 is a front view of a portable controller in accordance with an alternative preferred embodiment of the present invention; and FIG. 7 is a side view of the portable controller of FIG. 6 in accordance with directional arrow 7 in FIG. 6.

DETAILED DESCRIPTION OF THE PREFERRED EMBODIMENTS

Figure 4:
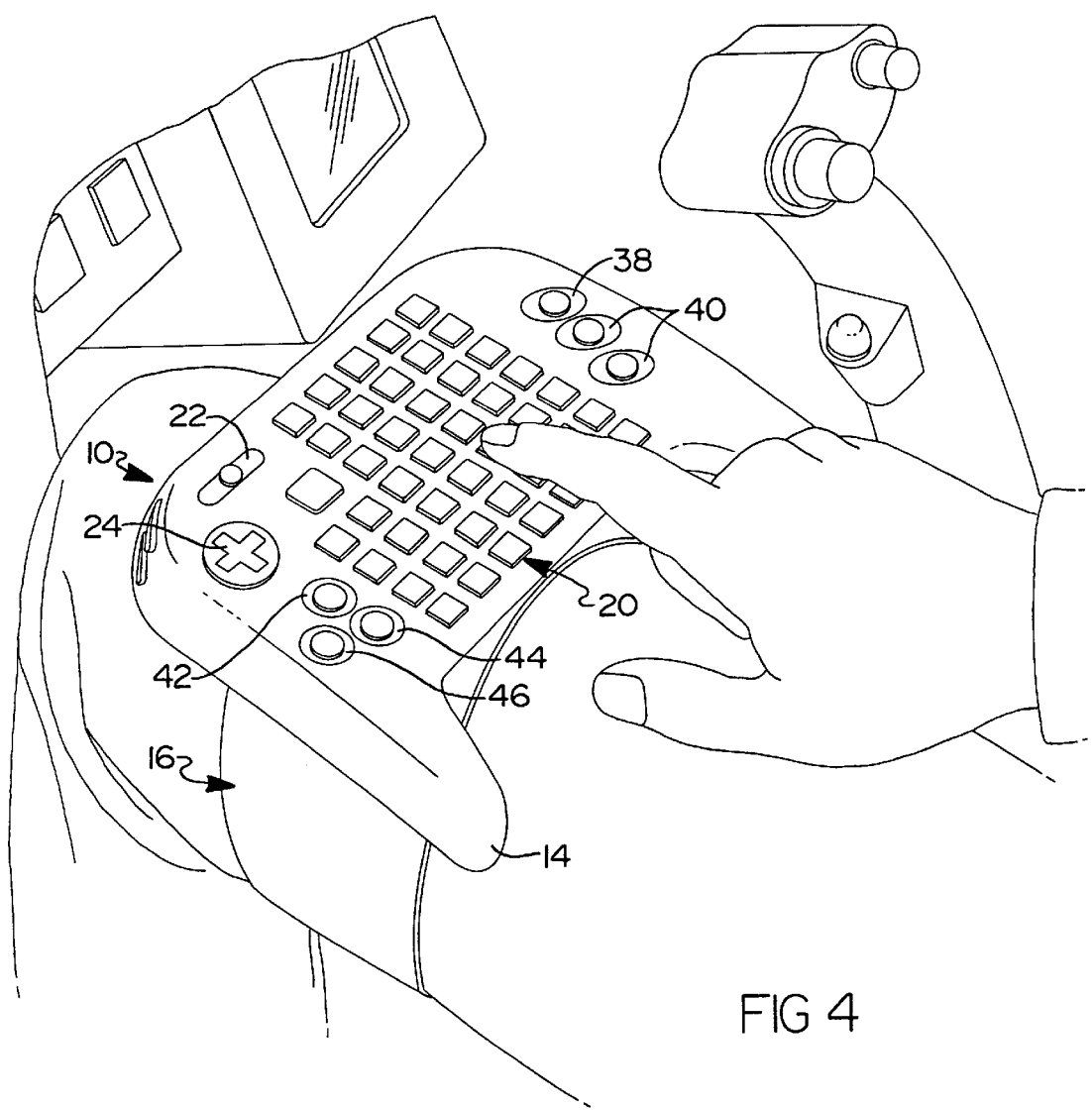
FIG. 4 is a perspective view of the controller of FIG. 3 mounted on the thigh of the non-pilot crew member.

Referring to FIG. 1, there is shown a portable controller 10 in accordance with a preferred embodiment of the present invention. It will be appreciated that the controller 10 can be used with a wide variety of commercial aircraft, but is particularly well adapted for use with military aircraft, and more particularly military rotorcraft. As such, the following description of the controller 10 will be given in the context of using the controller 10 with a military aircraft.

The controller 10 generally includes an ergonomically shaped housing 12 having a pair of enlarged side portions 14. The side portions 14 allow the housing 12 to be easily grasped with one or both hands by a crew member who is not piloting the aircraft (i.e., the "non-pilot crew member") which the controller 10 is being used with. The enlarged portions 14 also enable the controller 10 to be rested more easily on a thigh of the non-pilot crew member when the crew member is in a seated position. A strap 16 may be secured by any conventional means to the rear surface of the housing 12 so that the housing can be secured around the thigh of the non-pilot crew member. Conventional hook and loop type fastener systems, such as Velcro®, can be used to allow the strap 16 to be quickly secured around the user's thigh.

The controller 10 includes an interface cable 18 allowing the controller 10 to be interfaced with various flight/weapons/sensor control systems of the aircraft. In one preferred embodiment, the controller 10 communicates via a RS-422 interface with the aircraft's flight, weapons and sensor control systems. It will be appreciated, however, that any suitable form of interface system could be incorporated for use with the controller 10. For example, a RS-232 interface could be employed. Furthermore, in some applications, a radio frequency (RF) interface or possibly even an optical interface could be incorporated.

The controller 10 further includes a keyboard 20, a mode selector switch 22, and a cursor (i.e., "slew") control 24. The cursor control 24 essentially comprises a joystick-type, four-way (i.e., four axis) switch for moving a cursor up, down, back and forwards. The cursor control 24 enables the controller 10 to control movement of a cursor on the flight or weapons control display being interfaced to. The cursor control 24 can also be used to control a search light on the aircraft.

The mode selector switch 22 enables the controller 10 to be placed in communication with a plurality of independent flight control display systems. In the preferred embodiment illustrated, the mode selector switch 22 can be used to select "L", which places the controller 10 in communication with a first (i.e., left) multi-function display (MFD) of the aircraft. In this position communication is also enabled with a search light of the aircraft. This option makes the cursor control 24 operate in the same manner as the left slew controller on the collective if the aircraft is a military rotorcraft. In this mode, the alphanumeric keys of the keyboard 20 permit data entry on a first MFD of the aircraft.

When the mode selector switch 22 is placed in the "CIK" (Cockpit Integrated Keyboard) position, the controller 10 is interfaced with a first multi-purpose display (MPD). This enables the keyboard 20 to be used to enter alphanumeric characters, with the cursor control 24 allowing the cursor on the first MPD to be moved from one area to another of the display portion of the first MPD.

When the mode selector switch 22 is placed in the "R" position, the controller 10 is placed in communication with a second (i.e., right) MFD of the aircraft. Thus, by selecting the "L", "CIK" or "R" positions, the mode selector switch 22 can be used to interface the controller 10 with a plurality of independent flight control subsystems of the aircraft.

The keyboard 20 includes the standard alphanumeric keys, as well as an "enter" (ENT) key 26, a "recall" ("RCL") key 28 for allowing a previously typed in line of text that was erased to be quickly re-entered, an "insert" key (INS) 30 for inserting alphanumeric characters, a "delete" ("DEL") key 32 for deleting alphanumeric characters, and a "clear all" ("CLR ALL") key 34 for clearing entire fields of alphanumeric characters or text with a single key stroke.

In military applications, it will be appreciated that the portable controller 10 will preferably incorporate a number of additional controls. One such control is a trigger switch 36, visible in FIG. 2. The trigger switch 36 is surrounded by a trigger guard 36a and is used for firing a selected weapon. Alternatively, trigger switch 32 could be formed as a "push-to-talk" button, such as a transmit push button on a two way radio receiver/transmitter.

Referring further to FIG. 1, additional controls are preferably included when the controller 10 is used in a military application. One such switch is a "door open" switch 38 for opening a weapons bay door of the aircraft. One or more auxiliary switches 40 which may also be used for various auxiliary functions specific to the particular aircraft with which the controller 10 is being used. A "previous" button 42 and a "next" button 44 is included to allow sequencing between a plurality of targets being tracked by a weapons system of the aircraft. The "previous" button 42 is used to sequence from one "primary track" back to the previous "primary track" on the weapons system. The "next" button 44 is used to sequence the weapons system from the current "primary track" to the next highest priority target. A "find" button 46 is used to command a target acquisition system to locate and engage track on a target in a target data base of the weapons system of the aircraft. A "Laser" button 48 can be used to engage a laser guided weapon to track a designated target. A "hook" button 50 "selects" a target when the cursor is used to designate a target, or to select a point or item on a digital map.

It is a principal advantage of the portable controller 10 that all of the above-described functions can be controlled by the non-pilot crew member from a position remote from the control panel of the aircraft. This completely eliminates the possibility of unintended inputs being made by the non-pilot crew member to the collective or the side arm controller of the aircraft, if such aircraft is a rotorcraft. The portable controller 10 also frees up significant space on the control panel of the aircraft by not requiring replication of various switches for enabling the non-pilot crew member to control the above-described functions and operations.

It is also an important advantage of the present invention that the portable controller 10 significantly improves the ergonomics associated with controlling the above-described functions and operations. The controller 10 eliminates repetitive hand and arm movements that would otherwise be needed if the non-pilot crew member were required to frequently reach out to the control panel of the aircraft to engage the various controls as described above. The controller 10 also enables the non-pilot crew member to hold the controller 10 more directly in line with the display system of the aircraft being interfaced with to thus significantly improve the convenience, ease and ergonomics with which the various display systems of the aircraft are interfaced with. This also serves to reduce fatigue of the non-pilot crew member. The light weight of the controller is also a significant advantage, and is achieved in part by using the existing displays of the aircraft, rather than incorporating a supplemental display into the controller 16.

Figure 5:
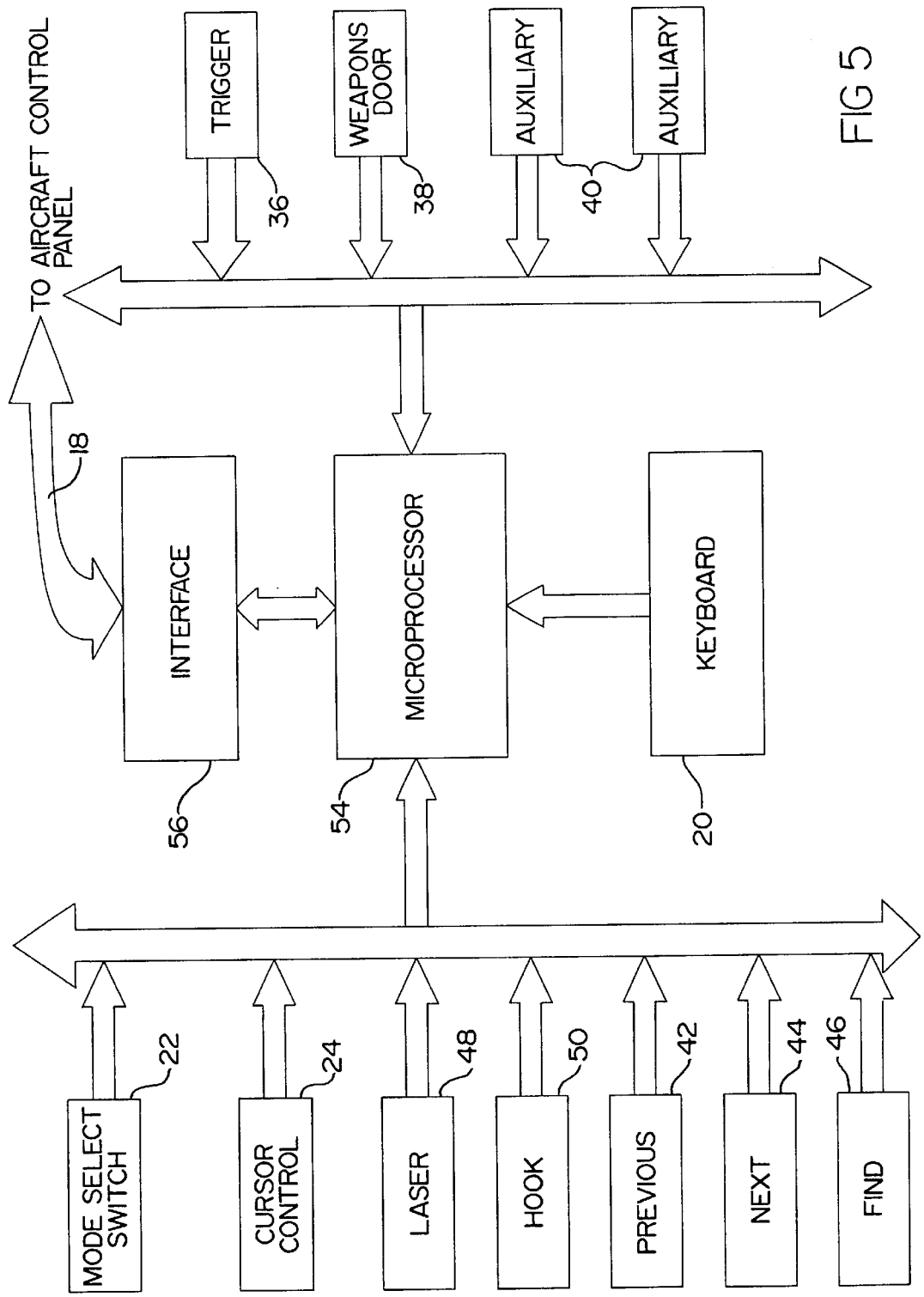
FIG. 5 is a simplified block diagram of the portable controller of the present invention.

Referring now to FIG. 5, a simplified block diagram of the major components of the controller 10 is shown. A microprocessor 54 manages the inputs from the various switches and the cursor control 24 and communicates with an interface circuit 56. As mentioned previously, this interface circuit may comprise a RS-422 or a RS-232 interface, or virtually any other form of interface that is suitable for this form of application. The microprocessor 54 is preferably an 8-bit microprocessor, but it will be appreciated that any microprocessor capable of managing the various switch inputs and controls described in connection with FIG. 1 could be used.

Referring now to FIGS. 6 and 7, an alternative preferred embodiment 100 of the portable, hand-holdable controller of the present invention is shown. This embodiment 100 essentially provides two independent cursor (i.e., "slew") controls 102 and 104 which form joystick-like switches for providing four axis control of a pair of independent multifunction displays (MFDs) of the aircraft. A keyboard 106 is also provided for entering flight data. A small video display 108 is provided for viewing the inputted flight data before transmitting same to the flight control subsystem with which the controller 100 is in communication with. The video display 108 may take a variety of forms, such as a liquid crystal display (LCD) panel. In one preferred form this display comprises a single line, 23 character display panel.

On the left side of the controller 100 is a "Laser" switch 110, a "Previous" switch 112, a "Find" switch 114 and a "Next" switch 116. The functions of these switches are identical to the functions of switches 42–48 given in connection with the description of the controller 10. In addition, a "NO TARGET" switch 118 is included for allowing the user to communicate that an item identified on a weapons system is not a target.

On the right side of the controller 100 a "Details" switch 120 is included for obtaining additional details on items that have been selected from a digital map on a display system of the aircraft. A "FOV" ("Field of View") switch 122 is provided for toggling between different fields of view on a selected sensor of the aircraft. A "Sensor" switch 124 is included for toggling between two or more different sensors, such as between a Forward Looking Infrared ("FLIR") sensor and a Television ("TV") sensor carried by the aircraft.

Switches 120–124 are specific to functions directed to the multifunction display that the right cursor control 104 is associated with. Switches 110–118 are specific to the display system which the cursor control 102 is associated with. Like the controller 10, an interface cable 126 couples the controller 100 to a suitable connection point on the control panel in the cockpit of the aircraft. A strap 128 secured to a housing 130 of the controller 100 allows the controller 100 to be easily secured to a thigh of the non-pilot crew member if desired. Alternatively, the enlarged portions 132 of the housing 130 and the overall light weight of the controller 100 allow it to be easily held by the non-pilot crew member for extended periods of time.

Referring to FIG. 7, a "Trigger" switch 134 is also included for firing a designated weapon. A pivotably moveable trigger guard 130a is included to cover the trigger switch 134 when access to this switch is not required.

It will be appreciated that while the present invention is especially well adapted for use with aircraft of all types, that it could just as easily be employed in various other applications with little or no modifications. For example, the present invention could be employed in civil commercial applications, such as in the trucking industry or with law enforcement vehicles, or any other application where a passenger in a vehicle would need to enter data or commands at a control panel of the vehicle, and where the ability to enter such information remotely (i.e., without accessing the control panel directly) by the passenger in the vehicle would be advantageous.

Also, it will be appreciated that while the various switches and function buttons of the present invention have been described with reference to a military application, that these switches and function buttons could easily be programmable controls. This would enable each switch and/or button to be programmed (i.e., customized) to suit a specific application. Thus, the invention could be employed in a variety of diverse industries.

Those skilled in the art can now appreciate from the foregoing description that the broad teachings of the present invention can be implemented in a variety of forms. Therefore, while this invention has been described in connection with particular examples thereof, and particularly with regard to military rotorcraft, the true scope of the invention should not be so limited since other modifications will become apparent to the skilled practitioner upon a study of the drawings, specification and following claims.

What is claimed is:

1. A portable, hand-holdable controller adapted to interface with first and second control systems of a vehicle to permit remote control of each of said control systems by a crew member via said controller, said portable controller comprising:

a first cursor control for controlling a cursor associated with said first control system;

a second cursor control for controlling the second control system independently of the first control system;

a keyboard for entering information to said one control system; and an interface for communicating with said one control system;

a multi-position mode selector switch for allowing said crew member to select one of said control systems for use.

2. The controller of claim 1, further comprising:

a mode select switch for enabling said portable controller to be configured to communicate remotely with a selected one of a plurality of control systems of said vehicle.

3. The controller of claim 1, further comprising at least one weapons control switch for remotely controlling a weapon associated with said vehicle.

4. The controller of claim 1, wherein said interface comprises a RS-422 interface.

5. The portable controller of claim 1, further comprising:
  a housing adapted to be supported on a leg of said crew member; and
  a strap for securing said housing to said leg of said crew member.

6. The portable controller of claim 1, further comprising a display panel for displaying said information entered from said keyboard.

7. A portable, hand-holdable controller adapted to interface with a plurality of functionally independent flight control systems of an aircraft disposed on a control panel of a main cockpit area of said aircraft, to enable a non-pilot crew member seated within a cockpit of said aircraft, but remotely of said main cockpit area, to remotely control said flight control systems, said portable hand-holdable controller comprising:
  a housing adapted to be grasped and easily held by said non-pilot crew member;
  a cursor control for controlling a cursor of said flight control system;
  a keyboard for allowing said crew member to input information to at least one of said flight control systems;
  a mode selector switch for enabling said crew member to select which one from said plurality of functionally independent flight control systems said controller is interfaced to;
  an interface for communicating with said plurality of flight control systems; and
  wherein said mode selector switch comprises a first position, a second position and a third position, each said position enabling said cursor control to control a different display system of said aircraft.

8. A method for enabling a non-pilot crew member of a vehicle to remotely control a control system of said vehicle, said method comprising the steps of:
  using a keyboard disposed within a hand-holdable housing to input information for controlling said control system;
  using an interface system to interface said keyboard to said control system; and
  using at least one weapons control switch to remotely control a weapons control system of said vehicle;
  using a multi-position mode selector switch to select one of a plurality of display systems to be controlled by said keyboard.

9. The method of claim 8, further comprising the step of;
  using a cursor control element disposed on said housing to enable said crew member to remotely control a position of a cursor associated with said control system.

10. The method of claim 8, further comprising the step of:
  using a mode selector switch disposed on said housing to enable communication with a selected one of a plurality of said control systems of said vehicle.

11. A portable controller adapted to remotely interface with a plurality of flight control systems of an aircraft disposed on a control panel within a cockpit of said aircraft, and holdable by a non-pilot crew member of said aircraft, said portable controller comprising:
  a housing adapted to be easily handled by said non-pilot crew member during flight for extended periods of time;
  a multi-position mode selector switch for enabling said crew member to set said portable controller to communicate with a selected one of said plurality of flight control systems;
  a keyboard for enabling said crew member to input information to said selected flight control system;
  an interface for communicating with said plurality of flight control systems;
  a cursor control for controlling a cursor of one of said flight control systems; and
  at least one weapons control switch for remotely controlling a weapons control system of said aircraft.

12. A portable, hand-holdable controller adapted to interface with a plurality of functionally independent flight control systems of an aircraft disposed on a control panel of a main cockpit area of said aircraft, to enable a non-pilot crew member seated within a cockpit of said aircraft, but remotely of said main cockpit area, to remotely control said flight control systems, said portable hand-holdable controller comprising:
  a housing adapted to be grasped and easily held by said non-pilot crew member;
  a cursor control for controlling a cursor of said flight control system;
  a keyboard for allowing said crew member to input information to at least one of said flight control systems;
  a mode selector switch for enabling said crew member to select which one from said plurality of functionally independent flight control systems said controller is interfaced to;
  an interface for communicating with said plurality of flight control systems; and
  at least one switch for controlling a target acquisition system of said aircraft.

13. A portable, hand-holdable controller adapted to interface with a plurality of functionally independent flight control systems of an aircraft disposed on a control panel of a main cockpit area of said aircraft, to enable a non-pilot crew member seated within a cockpit of said aircraft, but remotely of said main cockpit area, to remotely control said flight control systems, said portable hand-holdable controller comprising:
  a housing adapted to be grasped and easily held by said non-pilot crew member;
  a cursor control for controlling a cursor of said flight control system;
  a keyboard for allowing said crew member to input information to at least one of said flight control systems;
  a mode selector switch for enabling said crew member to select which one from said plurality of functionally independent flight control systems said controller is interfaced to;
  an interface for communicating with said plurality of flight control systems; and
  wherein said controller comprises a switch for controlling a weapons bay door of said aircraft.

14. A portable, hand-holdable controller adapted to interface with a plurality of functionally independent flight control systems of an aircraft disposed on a control panel of a main cockpit area of said aircraft, to enable a non-pilot crew member seated within a cockpit of said aircraft, but remotely of said main cockpit area, to remotely control said flight control systems, said portable hand-holdable controller comprising:

a housing adapted to be grasped and easily held by said non-pilot crew member;

a cursor control for controlling a cursor of said flight control system;

a keyboard for allowing said crew member to input information to at least one of said flight control systems;

a mode selector switch for enabling said crew member to select which one from said plurality of functionally independent flight control systems said controller is interfaced to;

an interface for communicating with said plurality of flight control systems; and wherein said controller comprises a switch for controlling a laser targeting function of a weapons system of said aircraft.

15. A portable, hand-holdable controller adapted to interface with a plurality of functionally independent flight control systems of an aircraft disposed on a control panel of a main cockpit area of said aircraft, to enable a non-pilot crew member seated within a cockpit of said aircraft, but remotely of said main cockpit area, to remotely control said flight control systems, said portable hand-holdable controller comprising:

a housing adapted to be grasped and easily held by said non-pilot crew member;

a cursor control for controlling a cursor of said flight control system;

a keyboard for allowing said crew member to input information to at least one of said flight control systems;

a mode selector switch for enabling said crew member to select which one from said plurality of functionally independent flight control systems said controller is interfaced to;

an interface for communicating with said plurality of flight control systems; and wherein said controller comprises a switch for locking onto a target tracked by a weapons system of said aircraft.

* * * * *